Dec. 15, 1942.   E. H. LANGE   2,305,262
METHOD AND MEANS FOR NORMALIZING THERMIONIC OSCILLATORS
Filed June 30, 1941

Edward H. Lange.
INVENTOR.

Patented Dec. 15, 1942

2,305,262

UNITED STATES PATENT OFFICE 2,305,262

METHOD AND MEANS FOR NORMALIZING THERMIONIC OSCILLATORS

Edward H. Lange, Baltimore, Md.

Application June 30, 1941, Serial No. 400,555

12 Claims. (Cl. 250—36)

This invention pertains to thermionic oscillators, and more particularly to a method and means for minimizing the undesirable deviations in magnitude of generated frequency of such oscillators, as influenced by variations in resistance of a thermionic tube, or tubes, between cathode and plate, and between cathode and grid, and by phase-modifying resistance of resonant or phase-shifting networks associated with the tube or tubes.

The principal object of this invention, is to provide a simple method for substantially reducing the modifying action upon the generated frequency of such resistances, and to provide simple means employing this method.

Another object of this invention, is to provide apparatus to accomplish these ends by a simple adjustment, effective at each frequency, over a range of generated frequencies. Other objects, and important features of this invention are hereinafter pointed out, and will be more clearly apparent from the following specification.

An important feature of this invention, is the utilization of certain unique relations found to exist in oscillator circuits when operated at their natural frequency, e. g., in an external phase-shifting network having inductance, capacitance and resistance, the frequency determined solely by the particular aggregation of inductance and capacitance, exclusive of network resistance. As is well known, none of the conventional types of oscillator governed by a self-sustaining feed back voltage to grid-cathode from a phase-shifting network connected to the plate-cathode circuit, operate at the natural frequency of the network. In each instance, the frequency at the equilibrium condition of the oscillator depends upon cathode-plate resistance; in inductance-capacitance oscillators deviation from natural frequency is variously related to a ratio of network resistance to cathode-plate resistance. This deviation while small in percentage, is nevertheless a troublesome feature for many purposes. Changes in cathode emission, plate voltage, and external circuit resistances, frequently result in undesired frequency variations amounting to thousands of cycles per second in a megacycle frequency, and to many cycles per second in an audio generated frequency. The above-mentioned unique relations indicate, that only by devising operation to be at the natural frequency of the external phase-fitting network, is there the capability of permanently compensating for the reactive-voltage component of the alternating voltage impressed upon the external network, relative to the cathode-plate alternating current, to maintain the cathode-plate alternating current in exact phase opposition to the sustaining feed-back voltage, independent of variations of cathode-plate resistance, and of phase-modifying external network resistance. The employment of these relations, as hereafter discussed in further detail, is an important feature of this invention, and is hereafter referred to as a normalizing process.

Referring to the drawing, Fig. 1 illustrates a conventional form of tuned-plate oscillator with application of a normalizing device in accordance with this invention.

Figure 1:
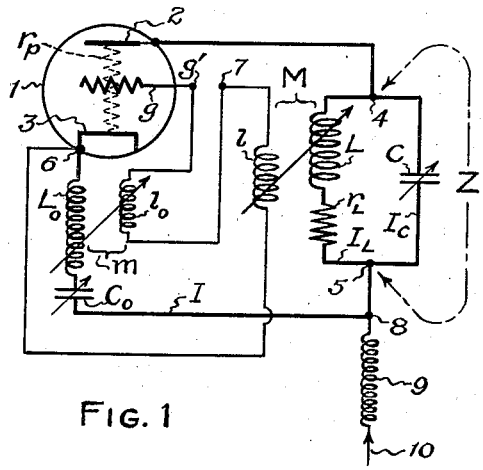

Referring to the tuned-plate oscillator of Fig. 1, at 1 is shown a thermionic triode, having a plate 2, cathode 3, and grid $g$. The plate is connected to the parallel resonant circuit as shown, said parallel resonant circuit being across the junction points 4, 5, one branch of the circuit consisting of the inductance L and resistance $r_L$, the other branch consisting of the capacitance C. Connected between the junction point 5 and a terminal 6 of the cathode 3, is a series resonant circuit consisting of the inductance $L_0$ and capacitance $C_0$. At $l$ is a tickler coil, variably inductively coupled with the inductance L by a mutual inductance M. One end of the tickler coil $l$ is connected to the terminal 6, the other end 7 is connected to the terminal $g'$ through the inductance $l_0$. The inductance $l_0$ is variably inductively coupled with the inductance $L_0$ by a mutual inductance $m$. At 9 is a choke coil, of very high impedance relative to any impedance of the aforementioned circuit elements. The choke coil 9 is connected through a source of continuous potential difference, and the circuit returned to the cathode, for example, the point 6. The choke coil 9 is intended to carry only the continuous current supplied to the plate 2, which flows from 6 through the source to 2, in the direction indicated by arrow 10. The grid $g$ is connected to terminal $g'$.

The alternating current is confined to the circuit 6—8—5—4—2—6, the magnitude of said current being indicated by I for the total alternating current passing through the thermionic tube-resistance $r_p$, by $I_L$ for the alternating current passing through the inductive branch, and by $I_c$ for the alternating current passing through the capacitance C.

Figure 2:
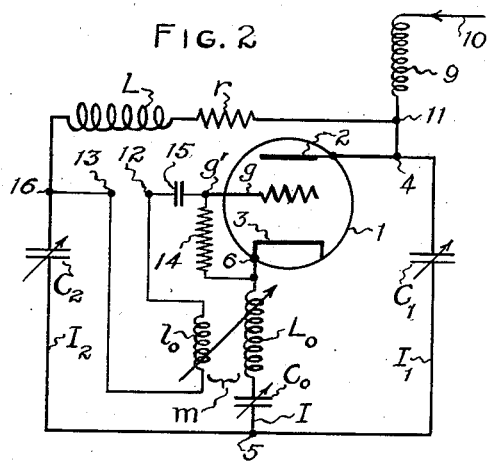
Fig. 2 illustrates a conventional form of Colpitts oscillator with application of a normalizing device for operating the circuit at its natural frequency, and minimizing undesirable effects upon generated frequency of variations in oscillatory circuit resistance, and in cathode-plate resistance of the thermionic tube.

Referring to the Colpitts type oscillator, Fig. 2, at 1 is shown a thermionic tube, having plate 2, grid $g$, and cathode 3. Connected to the plate 2, and between the junction points 4, 5, is a parallel resonant circuit, one of the branches of the circuit having resistance $r$, inductance L, and capacitance $C_2$, the other branch having the capacitance $C_1$. Connecting the junction point 5 with the terminal 6 of the cathode 3, is a series resonant circuit having inductance $L_0$ and capacitance $C_0$. At $i_0$, is an inductance coil variably inductively coupled with the inductance $L_0$ by a mutual inductance $m$, one end of $i_0$ being connected to the terminal 13 which connects with a terminal 16 of the capacitance $C_2$, the other end of $l_0$ being connected with the terminal 12 of a blocking condenser 15. The opposite end of the blocking condenser 15 is connected to the terminal $g'$, which connects with the grid $g$. The terminal $g'$, also connects with the terminal 6 of the cathode 3, through the leak-resistance 14. At 9 is a high impedance choke coil, one end of which is connected to the terminal 11 connecting with the plate 2, the other end being connected through a source of continuous potential to the terminal 6, the direction of the unidirectional current supplied to plate 2 being as indicated at 10.

The total alternating current is confined to the path 4—2—3—6—5, and is indicated in magnitude by I, the branch alternating currents being indicated in magnitude by $I_2$ for the $r$—L—$C_2$ branch, and by $I_1$ for the $C_1$ branch. The blocking condenser 15 is understood to serve to keep the continuous plate potential from being applied to the grid, and to be otherwise of negligible reactance compared with the impedance of any of the circuit elements, and likewise the leak-resistance 14 to be of very high value compared with the impedance of any of the circuit elements. The choke coil 9 is understood to carry only the continuous plate supply current, and to have an impedance of very high value compared with the impedance of any of the circuit elements.

Figure 3:
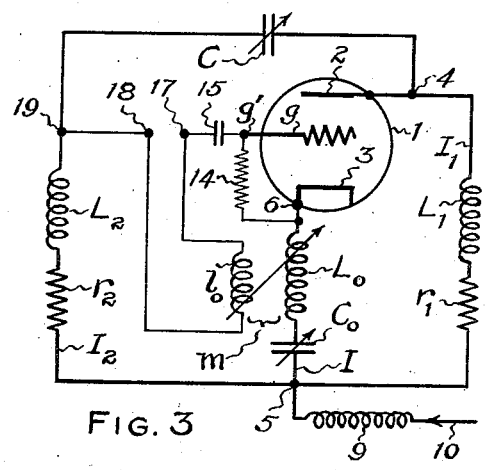
Fig. 3 illustrates a conventional form of Hartley-type oscillator with application of method and means of this invention for normalizing the oscillator, to minimize undesirable effects upon generated frequency of variations of the circuit resistances, and of the cathode-plate resistance of the tube.

Referring to Fig. 3, a Hartley type oscillator is shown, having the thermionic tube 1, with plate 2, grid $g$, and cathode 3. Between the junction points 4, 5, is a parallel resonant circuit, having the capacitance C, inductance $L_2$ and resistance $r_2$ in one branch, and the inductance $L_1$ and resistance $r_1$ in the other branch, the magnitude of the alternating current in these branches being indicated by $I_2$ and by $I_1$ respectively. Between the terminal 6 of the cathode 3, and the junction point 5, is a series resonant circuit having inductance $L_0$ and capacitance $C_0$, the magnitude of the alternating current carried by the series resonant circuit and by the cathode-plate resistance $r_p$ being indicated by I. Variably inductively coupled with $L_0$ is the inductance coil $l_0$, coupled by a mutual inductance $m$. One end of the coil $l_0$ is connected to the terminal 18, which connects with the terminal 19 of the inductance-resistance $L_2$—$r_2$, the other end being connected to the terminal 17 of the blocking condenser 15. The opposite terminal of the condenser 15 is connected to the terminal $g'$, which connects with the grid $g$, and also with the cathode through the leak-resistance 14. The plate 2 is supplied with unidirectional current through the choke coil 9, in the direction 10. The blocking condenser 15, leak-resistance 14, and choke coil 9, have the aforementioned relative impedance values in comparison with impedances of any of the circuit elements, and similarly the circuit of the coil 9 is returned through a source of continuous potential difference to the terminal 6.

The application of the principles of this invention is illustrated for each of the foregoing well known types of oscillator, it being understood, as hereinafter further referred to, that these principles are of wider scope, and applicable generally to thermionic oscillating systems in which a phase-shifting network is connected in a circuit with the cathode-plate resistance, and the natural period-determining constants of said network employed to impress upon the grid-cathode a self-sustaining feed-back voltage of substantially opposite phase to the input alternating current of said network.

Figure 4:
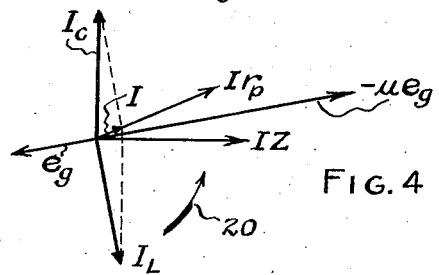
Fig. 4 illustrates a vector diagram of a conventional tuned-plate oscillator which has not been normalized, and shows operation of the factors in such an oscillator which give rise to the undesirable frequency variations.

Referring to Figs. 1, 2, and 3, if the inductance $L_0$ is omitted, and the opened terminals connected together, and likewise the coil $l_0$ omitted, and the opened terminals connected together, and the capacitance $C_0$ made very large, so as to have negligible reactance across the points 5, 6, in relation to any of the circuit impedances, then each of the resultant oscillators is of well known type. The factors in such circuits effecting the undesirable frequency variations, will be apparent from a consideration of the vector diagram Fig. 4, illustrating certain phase and magnitude relations which prevail in a tuned-plate oscillator, when oscillations are generated. Designating the input impedance of any external network connected in series with the cathode-plate alternating current circuit as Z, then in the particular instance of the tuned-plate oscillator, Z is the impedance of the parallel circuit between the junction points 4, 5. In general, to sustain an alternating current I through the cathode-plate alternating current resistance $r_p$, and through the external impedance Z, there must be established within the circuit an active generated alternating voltage equal to the vector sum of the current I times each of the resistance $r_p$ and the impedance Z. There is thus the alternating voltage drop I$r_p$ across the plate-cathode, and the alternating voltage drop IZ across the parallel circuit. The voltage IZ gives rise to the alternating current through the capacitance C, indicated by $I_c$, 90° in advance of IZ, and to the current through the inductance L and the resistance $r_L$ indicated by the vector $I_L$, lagging IZ by less than 90°, the direction of rotation of vectors being as indicated by arrow 20. The vector sum of $I_c$ and $I_L$ is indicated by I, and is the alternating current flowing through $r_p$. Along a direction 90° displaced from $I_L$, is the feedback voltage vector, of voltage impressed upon the grid-cathode by the tickler coil $l$. Of the two possible polarities of this voltage, the only one of importance here is the one which upon amplification is in the proper direction to sustain the current I; this voltage vector is indicated by $e_g$ for the feed-back alternating voltage. Designating the amplification factor of the tube 1 by $\mu$, then for self-sustained oscillations to exist by way of feed-back, the vector sum of the alternating voltages IZ and $Ir_p$ required to maintain the current I must not be larger than $\mu$ times $e_g$, and the vector representing this sum must be collinear with $e_g$, i. e., $-\mu e_g$ must be a vector in the same direction as, and at least equal in magnitude to, the vector sum of IZ and $Ir_p$. With these conditions fulfilled, self-sustained oscillations will be produced, at a frequency determined largely by the inductance and capacitance of the external network, but nevertheless not completely independent of the magnitude of the cathode-plate resistance, $r_p$. For example, in the case of the tuned-plate oscillator the natural frequency of the external circuit is the well known frequency $f=1/2\pi\sqrt{LC}$, whereas the generated frequency as influenced by $r_p$ is indicated by the well known Equation 8, subsequently derived herein.

A more detailed analysis of typical oscillators is given subsequently herein, however, it will aid in visualizing the normalizing process, to first consider a typical vector diagram. The reasons for variation of the generated frequency with variations of $r_p$ or $r_L$, are apparent from Fig. 4. If for example, the resistance $r_p$ is changed, e. g., through variation of the heater current of the cathode, or filament current, or electron emissivity, or of the plate-cathode continuous voltage, then the phase relationship of the vector sum $-\mu e_g$, i. e., IZ and $Ir_p$, is changed relative to IZ. Consequently, the vector $e_g$ must be correspondingly displaced to remain collinear with the vector sum, and since the phase relationship of $e_g$ to $I_L$ is fixed, $I_L$ must be correspondingly displaced to bring about a new equilibrium. This is accomplished by a change in the generated frequency altering the reactance-resistance ratio of the current $I_L$. Similarly, if the resistance $r_L$ of the tuned circuit is changed, the vector $I_L$ is displaced in phase, and along with it $e_g$, and equilibrium is reestablished by alteration of the generated frequency modifying the reactance-resistance ratio of $r_L$. Similar conditions pertain to other oscillators, for example the Colpitts or Hartley types Figs. 2 and 3, respectively.

The existence of certain unique relationships, utilized in this invention, will first be illustrated with reference to the foregoing tuned-plate oscillator. It will be noted that in this circuit, and with reference to Fig. 4, the cathode-plate alternating current I cannot be collinear with the feed-back voltage vector $e_g$, in an operating condition of the oscillator, and in phase opposition to $e_g$, owing to the phase-determining characteristics of the external network, in this instance dependent upon $r_L$, and consequently to the phase disturbing effects of $r_p$. This is a fundamental defect of oscillator networks, leading to dependence of generated frequency upon the cathode-plate alternating current resistance, upon the resultant reactive component of network impedance relative to I, at a frequency determined by the natural frequency-determining characteristics of the network, and upon inconstancy of phase characteristics of external network.

However, if the natural frequency is impressed upon the parallel resonant circuit of the tuned-plate oscillator, there exist certain useful relations employed in this invention. First, the cathode-plate alternating current I has a 90° phase relationship with $I_L$, i. e., the feed-back voltage vector $e_g$ is in phase opposition to I, independent of variations of $r_L$, as a consequence of the natural frequency; and second, the equivalent reactance of the parallel circuit is constant, independent of $r_L$, and equal in this particular instance to $\sqrt{L/C}$. Thus, the total impedance, in vector form, of the parallel resonant circuit operating at the natural frequency, is readily shown to be:

$$Z=L/Cr_L-j\sqrt{L/C}$$

in which the equivalent resistance is $$R_{eq}=L/Cr_L$$

and the equivalent reactance is $$X_{eq}=\sqrt{L/C}$$

Figure 5:
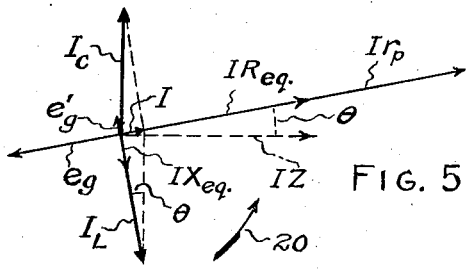
Fig. 5 illustrates a vector diagram of the tuned-plate oscillator normalized in accordance with the method of this invention, and the features operating to minimize the undesired frequency variations of the resultant generated frequency.

The phase angle $\theta$ is thus given by $$\theta=\tan\frac{-1}{\sqrt{L/C}}$$

as indicated in Fig. 5, for the phase angle of vector IZ relative to I. The symbol $j$ as used herein, being in accordance with well-known usage, applied to indicate quadrature components of vectors. It is therefore apparent, that at the natural frequency, as the resistance $r_L$ is varied, $\theta$ changes accordingly, but all the while the total alternating current I remains in exact phase opposition to the feed-back voltage vector $e_g$, set up in the tickler coil $l$. This condition is illustrated in Fig. 5. The feed-back voltage $e_g$ is therefore always collinear with the voltage drop $Ir_p$, and consequently changes in the magnitude of $r_p$ can have no effect upon the phase relations of the oscillator when the phase-disturbing effect of the reactive voltage $IX_{eq}$ is separately compensated.

An important feature of this invention, is the provision of separate, precise compensation for the phase-disturbing effect of the reactive voltage of the external network at the natural frequency, so that the equivalent of this voltage need not be provided by the usual self-sustaining feed-back voltage, through the medium of deviating the generated frequency away from the natural frequency to provide the requisite component of $e_g$ in quadrature with cathode-plate alternating current I, to maintain equilibrium of the oscillator.

Referring now to Figs. 1, 5, when the series resonant circuit $L_0$, $C_0$, is tuned to the natural frequency, there is no voltage drop across the circuit, beyond a relatively small resistance drop of the coil $L_0$, which is in effect simply a very small incremental resistance to $r_p$. The coil $l_0$ has a voltage $e'_g$ set up in it, 90° displaced in phase from I, and by adjustment of the mutual inductance $m$, the magnitude of $e'_g$ can be made sufficient to compensate for the phase-disturbing effect of $IX_{eq}$, separately, thereby eliminating the necessity of the oscillator to wander off natural frequency to establish the required equilibrium. Another important feature of these principles, is that the above-described adjustment of $m$, suffices for a range of natural frequencies, as further discussed in the equations given below and the variable capacitances C, $C_0$, can be tuned simultaneously by mechanical connection of rotors; in the case of the Colpitts circuit, Fig. 2, the rotors of $C_0$, $C_1$, $C_2$, can have a common connection 5.

The following mathematical equations illustrate in further detail some of the adjustments for typical oscillators, in accordance with the principles of this invention, and are hereinafter discussed, step by step.

Normalized tuned-plate type:

$$f = \text{frequency},$$
$$\omega = 2\pi f,$$
$$Z = \frac{Z_L Z_C}{Z_L + Z_C},$$
$$Z_L = r_L + j\omega L,$$
$$Z_C = -\frac{j}{\omega C}.$$

$$-\frac{E_g}{I} = \frac{1}{\mu}[r_p + Z] \quad (1)$$

$$e_g + e'_g = -j\omega M I_L + j\omega m I,$$

$$I_L = \frac{Z}{Z_L} I \quad \frac{e_g + e'_g}{I} = -j\omega \left[\frac{MZ_C}{Z_L + Z_C} - m\right] \quad (2)$$

$$j\omega\mu\left[\frac{MZ_C}{Z_L + Z_C} - m\right] \geqq r_p + Z \quad (3)$$

for self-sustained oscillations.

Substituting values of $Z_L$, $Z_C$, and $Z$:

$$\mu\frac{M}{C} - \frac{L}{C} + j\frac{r_L}{\omega C} - j\mu\omega m r_L + \mu\omega m\left[\omega L - \frac{1}{\omega C}\right] \geqq$$
$$r_p r_L + j r_p\left[\omega L - \frac{1}{\omega C}\right] \quad (4)$$

Equating quadrature components:

$$j\left[r_L\left(\frac{1}{\omega C} - \mu\omega m\right) - r_p\left(\omega L - \frac{1}{\omega C}\right)\right] = 0 \quad (5)$$

Making $$\left(\frac{1}{\omega C} = \mu\omega m\right)$$

by adjustment, $$\omega L = \frac{1}{\omega C}, \text{ or } \omega = \frac{1}{\sqrt{LC}}$$

i. e., generated $\omega$ is independent of $r_p$ and $r_L$ (6)
Adjustment requires:

$$m = \frac{1}{\mu C \omega^2} = \frac{L}{\mu} \quad (7)$$

For simultaneous tuning of $C$ and $C_0$, $$C = C_0, L = L_0, m = \frac{L_0}{\mu}$$

Without compensation: $m = 0$, and from (5)

$$\frac{1}{\omega C}(r + r_p) = r_p \omega L, \text{ or } \omega = \frac{1}{\sqrt{LC}}\sqrt{1 + \frac{r_L}{r_p}} \quad (8)$$

Equating in-phase components from (4)

$$\frac{\mu M - L}{C} \geqq r_p r_L, \text{ or } \frac{\mu}{r_p} \geqq \frac{r_L C}{M - \frac{L}{\mu}} \quad (9)$$

Normalized Colpitts type:

$$Z = \frac{Z_1 Z_2}{Z_1 + Z_2},$$
$$Z_1 = -jX_1 = -\frac{j}{\omega C_1},$$
$$Z_2 = r_2 + j(X_2 - X_g),$$
$$X_m = \omega m,$$

$$Z_g = -jX_g,$$
$$X_g = \frac{1}{\omega C_2},$$
$$X_2 = \omega L,$$
$$I_2 = \frac{Z}{Z_2} I.$$

$$-\frac{E_g}{I} = \frac{r_p + Z}{\mu} \quad (1)$$

$$e_g + e'_g = \left[\frac{Z_g Z}{Z_2} \times jX_m\right]I \quad (2)$$

$$\frac{e_g + e'_g}{I} = \frac{Z_g Z_1}{Z_1 + Z_2} + jX_m$$

∴ for self-sustained oscillations:

$$\frac{Z_g Z_1}{Z_1 + Z_2} + jX_m \geqq -\left(\frac{r_p + Z}{\mu}\right), \text{ or }$$

$$Z_1(\mu Z_g + Z_2) \geqq -(Z_1 + Z_2)(r_p + j\mu X_m) \quad (3)$$

Substituting values of $Z_1$, $Z_2$, $Z_g$, $$-X_1 X_g \mu - jX_1 r + X_1(X_2 - X_g) \geqq jX_1 r_p - X_1 X_m \mu -$$
$$rr_p - j\mu r X_m - jr_p(X_2 - X_g) - \mu X_m(X_2 - X_g) \quad (4)$$

Equating quadrature components:

$$r(\mu X_m - X_1) + r_p[X_2 - (X_g + X_1)] = 0 \quad (5)$$

Making $\mu X m = X_1$ by adjustment, $X_2 = X_g + X_1$, or $$\omega = \sqrt{\frac{1}{L}\left(\frac{1}{C_1} + \frac{1}{C_2}\right)}$$

i. e., generated $\omega$ is independent of $r$ and $r_p$ (6)
Adjustment requires:

$$\mu\omega m = \frac{1}{\omega C_1}, \text{ or } m = \frac{L}{\mu} \cdot \frac{C_2}{C_1 + C_2} \quad (7)$$

For simultaneous tuning, $$L_o = L, \ C_1 = C_2 = 2C_o, \ m = \frac{L_o}{2\mu}$$

Without compensation: $m = 0$, and from (5)

$$r_p X_2 = r_p(X_g + X_1) + rX_1,$$

$$\therefore \omega = \sqrt{\frac{1}{L}\left[\frac{1}{C_2} + \frac{1}{C_1}\left(1 + \frac{r}{r_p}\right)\right]} \quad (8)$$

Normalized Hartley type:

$$Z = \frac{Z_1 Z_2}{Z_1 + Z_2},$$
$$Z_1 = r_1 + jX_1,$$
$$X_1 = \omega L_1,$$
$$Z_2 = r_2 + j(X_2 - X_c).$$
$$X_2 = \omega L_2,$$
$$X_c = \frac{1}{\omega C},$$
$$X_m = \omega m,$$
$$I_2 = \frac{Z}{Z_2} I,$$

$$-\frac{E_g}{I} = \frac{r_p + Z}{\mu} \quad (1)$$

$$Z_g = r_2 + jX_2,$$

$$\frac{e_g + e'_g}{I} = \frac{Z_g Z_1}{Z_1 + Z_2} - jX_m \quad (2)$$

$$\frac{Z_g Z_1}{Z_1 + Z_2} - jX_m \geqq -\left(\frac{r_p + Z}{\mu}\right) \quad (3)$$

for self-sustained oscillations.
Substituting values of $Z_1$, $Z_2$, $Z_g$ $$(\mu + 1)r_1 r_2 + jr_1[(\mu + 1)X_2 - X_c] + j(\mu + 1)r_2 X_1 -$$
$$X_1[(\mu + 1)X_2 - X_c] \geqq -(r_1 + r_2)r_p + j(r_1 + r_2)\mu X_m -$$
$$jr_p(X_1 + X_2 - X_c) - \mu X_m(X_1 + X_2 - X_c) \quad (4)$$

Equating quadrature components:

$$r_1[(\mu+1)X_2-X_c]+(\mu+1)r_2X_1 \gtreqless -r_p(X_1+X_2-X_c)+(r_1+r_2)\mu X_m \quad (5)$$

Put $$\frac{r_1}{r_2}=\rho$$

and $$\frac{L_1}{L_2}=\gamma$$

$\rho$ and $\gamma$ being constant ratios; then:

$$\rho r_2[(\mu+1)X_2-X_c]+(\mu+1)r_2X_1 \gtreqless -r_p(X_1+X_2-X_c)+$$

$$r_2(\rho+1)\mu X_m \quad (X_1+X_2-X_c)\left(1+\frac{\rho r_2}{r_p}\right)+$$

$$\frac{\mu r_2}{r_p}\left[\rho X_2+\left(1+\frac{1-\rho}{\mu}\right)X_1-(\rho+1)X_m\right]=0 \quad (5a)$$

Making $$(\rho+1)X_m=\rho X_2+\left(1+\frac{1-\rho}{\mu}\right)X_1$$

by adjustment, then:

$$X_1+X_2=X_c, \; \omega=\frac{1}{\sqrt{C(L_1+L_2)}} \quad (6)$$

independent of $r_p$, $r_1$ and $r_2$.

Adjustment requires:

$$m=L_2\left[\frac{\rho+\gamma\left(1+\frac{1-\rho}{\mu}\right)}{\rho+1}\right] \quad (7)$$

For simultaneous tuning, $$C_0=C, \; L_0=L_1+L_2, \; L_2=\frac{L_0}{1+\gamma}$$

Without compensation: $-m=0$, and from (5a)

$$\omega=\sqrt{\frac{\left(1+\frac{r_1}{r_p}\right)}{C\left[L_1\left(1+(\mu+1)\frac{r_2}{r_p}\right)+L_2\left(1+(\mu+1)\frac{r_1}{r_p}\right)\right]}} \quad (8)$$

Referring to the foregoing mathematical equations a quantitative vector analysis of the tuned-plate type, the Colpitts type, and the Hartley type oscillators is set forth, respectively, illustrating in each instance the undesired influence of cathode-anode resistance $r_p$ in modifying the generated frequency, and the utilization of this invention to overcome this undesired influence. Equation 1 in each instance expresses the alternating current in the cathode-plate circuit, when there is no mutual inductance $m$, i. e., when $m=0$, and when the grid $g$ is disconnected from the terminal $g'$, and the grid-cathode separately excited by an alternating voltage $E_g$, the circuit $L_0$, $C_0$, being tuned to the same frequency.

Equation 2 expresses the vector voltage across $g'$—6, when the coil $i_0$ has a mutual inductance $m$ with $L_0$, and the circuit is separately excited, as above.

Vector Equation 3 states the necessary conditions for self-sustained oscillations, and Equation 4 is an expansion of (3), giving relationship among vector components, collinear with, and at right angles to the cathode-plate alternating current I. The relationship among quadrature components is given in each instance by Equation 5. Equation 5 yields, when $m=0$, the generated frequency for the oscillator when not normalized; this frequency is given in each instance by Equation 8, which shows the manner of dependence of the generated frequency upon tuned circuit resistance, and upon cathode-plate resistance.

The conditions determining whether or not self-sustained oscillations will be produced, are given in each instance by the relationship among the real or in-phase components, Equation 4. For example, in the tuned plate type, Equation 9 which follows from Equation 4, shows the necessary magnitude of the tube mutual-conductance in relation to circuit constants, for self-sustained oscillations; this is a well known relation, and unchanged by the normalizing process. Similarly, from inspection of Equation 4 for the other types of oscillator, it is evident that the critical conditions for oscillations are unaltered by normalizing.

This invention is however, primarily concerned with the generated frequency, and with the mode of operation of normalization, as disclosed in each instance by Equations 5, 6, and 7, to attain operation at natural frequency, independent of cathode-plate alternating current resistance, and of undesired power-factor modifying action of resistance of an external phase-determining network. Referring for example to Equation 5 for tuned plate oscillator, it will be noted that without a normalizing factor $\mu\omega m$, i. e., if $m=0$, oscillations do not take place at the natural frequency; however, by adjusting $m$, so that $$\mu\omega m=\frac{1}{\omega C}$$

thus requiring that $$\omega L=\frac{1}{\omega C}$$

oscillations take place at the natural frequency, independent of $r_p$ and of $r_L$. This adjustment, in this specific case, as indicated requires: $m=L/\mu$.

Similarly for the Colpitts or Hartley types, Equations 5, 6, and 7 of respective oscillator types, show the normalizing adjustment for accomplishing oscillations at the respective natural frequencies, independent of cathode-plate resistance, and of resonant circuit resistances. The Hartley type oscillator as shown in Fig. 3, has inductances $L_1$ and $L_2$ uncoupled, however a single coil can be used with intermediate tap at 5, in which case the inductances will be coupled with a mutual inductance $M'$, and the values of $L_1$ and $L_2$ must be replaced respectively with: $L_1+M'$, and $L_2+M'$.

It will be noted therefore, that the above-mentioned properties utilized, permit of a wide variation of the cathode-plate alternating current resistance, and of tuned circuit resistance, and the Equations 5 show in each instance that the circuit resistances are balanced out in their effect upon the generated frequency, and that this process is not premised upon smallness of the indicated circuit resistances in relation to the circuit reactances.

It will be noted that the series inductance $L_0$ and capacitance $C_0$, as connected in Figs. 2 and 3, carry the total cathode alternating current of the tube, that is both the cathode-plate alternating current and the grid-cathode alternating current, and that this condition can also be accomplished with other networks, by the use of the leak resistance and a condenser such as 14, for keeping the continuous plate supply voltage from direct application upon the grid. Thus, the component of the grid-cathode alternating current is carried through $L_0$, $C_0$, when the operation of the oscillator is such as to give rise to grid loading, that is the shunting of the points 5—16, Fig. 2, or 5—19, Fig. 3, with cathode-grid resistance. In like manner, as heretofore discussed, a feed-back voltage in quadrature phase with this current is introduced into the grid-cathode circuit, and utilized to compensate for effective displacement thereby arising in the voltage across the terminals 5—16, or 5—19 respectively, and change of resultant input reactance, by corresponding adjustment of the coupling $i_0$ with $L_0$.

Compensation of the cathode-plate resistance and of network resistances without the employment of compensation for grid-cathode current, can be carried out by disconnecting the grid $g$ from the terminal $g'$, and introducing a relatively low power buffer-amplifier between $g$ and $g'$. Such an amplifier would have its input taken by potentiometer means from the leak resistance 14, and employ a small part of the voltage across said resistance from 6; would feed the grid $g$ from its output circuit, and otherwise impress upon $g$—6 a voltage of the same phase and magnitude as exists across $g'$—6, in a manner well understood.

The principles of this invention are not limited in application to the specific illustrations above described, there being many variations of external networks capable of connection in the cathode-plate circuit, capable when excited, of establishing between a pair of input-terminals connected in the plate-cathode circuit and a pair of out-put terminals connected to the grid-cathode, a voltage across said output-terminals in phase opposition to the current through said input-terminals, at a specific frequency; however, this condition is in general accompanied by a specific impedance at said input-terminals, i. e., by an equivalent resistance and equivalent reactance at the specific frequency. Thus, as previously discussed herein, such circuits will have the undesired variable frequency; also such circuits are suitable for the method and means of this invention. Likewise when such oscillators are normalized, the reactive voltage of the equivalent reactance is compensated by the quadrature feed-back voltage as heretofore described. When such oscillators are operated under conditions shunting grid-cathode resistance across said output-terminals, and consequently causing grid current to flow, in phase with the voltage across the output terminals, the total current is altered, and normalization completed by corresponding adjustment of coupling $i_0$ with $L_0$ to restore the equilibrium, it being understood that the total cathode alternating current passes through $L_0$ and $C_0$.

Having thus described several illustrative embodiments of my invention, it will be evident that changes can be made in the form and arrangement of parts without departing from the spirit of my invention, as set forth in the appended claims, and I do not therefore limit the scope of the invention to such particular embodiments, or otherwise than by the terms of the appended claims.

What is claimed is:

1. The apparatus for increasing the constancy of generated frequency, against resistance variations of the thermionic tube and of the resonant circuit, in a thermionic alternating current generator having a thermionic tube with cathode, grid and plate, a parallel inductance-capacitance circuit containing resistance, connected across the cathode-plate circuit, and a coupling means coupled with said inductance-capacitance circuit impressing a primary feed-back voltage across the grid-cathode of said tube, said apparatus consisting of a series resonant circuit connected in series with the cathode-plate alternating current circuit, tuned to the natural frequency of said inductance-capacitance elements, and having means variably inductively coupled with said series resonant circuit connected in series with the first said coupling means, providing a secondary feedback voltage; said secondary feedback voltage being so proportioned that upon amplification it equalizes the reactive voltage component of impressed voltage at the natural frequency, upon said inductance-capacitance circuit, relative to the cathode-plate alternating current, thereby maintaining said primary feed-back voltage in exact phase opposition to the cathode-plate alternating current, independent of variations of said resistances.

2. Apparatus for minimizing frequency modifying action upon the generated frequency, of changes in resistance between cathode and anode, and cathode and control-grid of a thermionic tube, and in resistance of a resonant network, in a thermionic alternating current generator having said thermionic tube, with cathode, anode and control-grid, said resonant network connected in the cathode-anode alternating current circuit, and a coupling means coupled with said network, impressing a self-sustaining feed-back voltage across the control-grid and cathode, said apparatus including a first inductance coil connected in series with said coupling means, and a second inductance coil and condenser connected in series with each other and connected in series with said resonant network, and connected to carry the total cathode thermionic alternating current.

3. The combination with a thermionic oscillator having a thermionic tube with cathode, grid, and plate, a parallel inductance-capacitance circuit containing resistance, connected between the cathode and plate, and a coupling means coupling the grid with said circuit, and impressing a primary feed-back voltage upon said grid, of a device for reducing frequency modifying action upon generated frequency, of changes in thermionic tube resistance and of changes in resistance of said parallel circuit, said device having tuned-reactance means connected in series with said parallel circuit, tuned to the natural frequency of said parallel circuit, including an adjustable coupling means impressing upon the grid-cathode in series with the first said coupling means a secondary feed-back voltage, in quadrature phase with the total thermionic alternating current passing through the cathode, and proportional to said current, said adjustable means serving to proportion said secondary feed-back voltage to establish in the cathode-plate alternating current circuit a voltage to equalize the reactive voltage of said parallel circuit, relative to said cathode-plate alternating current, at the natural frequency of said parallel circuit, for maintaining said primary feed-back voltage in phase opposition to said cathode-plate alternating current, as resistance of said parallel circuit and of said thermionic tube is varied.

4. In a thermionic alternating current generator having a thermionic tube with cathode, grid, and anode, and a phase-shifting network containing resistance, with input terminals connected in series with the cathode-anode, and output terminals connected to said network, having the property of providing voltage across said output terminals in phase opposition to the current into said input terminals, and a specific input terminal reactance, when a voltage of specific frequency is impressed upon said input terminals, the apparatus determining generation of said frequency, independent of variations of said network resistance, and of thermionic resistance between cathode and anode, and between cathode and grid, said apparatus including tuned reactance means serially connected between the cathode and said network, and inductance means serially connected between the grid and one of said output terminals, inductively coupled with said tuned reactance means, said means compensating both said input terminal reactance, and phase displacement of grid-cathode voltage caused by resistance between the grid and cathode.

5. In a thermionic alternating current generator having a thermionic tube with cathode, grid, and plate, and an inductance-capacitance phase-shifting network containing resistance, with input-terminals connected in series with the cathode-plate circuit and output-terminals connected to the grid-cathode, said network having the capability when excited at a specific frequency of providing a grid-cathode voltage in phase opposition to the input-terminal current, and having an input-terminal reactance at said frequency, the apparatus for regulating the generation of said frequency to constancy, independent of variations of cathode-plate tube resistance and of said network resistance, comprising tuned inductive-capacitive reactance means in series with the total cathode-plate alternating current circuit, tuned to said frequency, and coupling means coupled with said reactance means introducing in series with said output terminals across the grid-cathode an adjustable voltage in quadrature with the cathode-plate alternating current, proportional to said current, and proportioned to equalize upon amplification the reactive voltage of said input reactance, at said frequency.

6. In combination with the structure of claim 5, means for simultaneously tuning said inductance-capacitance network and said tuned inductive-capacitive reactance means to determine the generation of a range of said frequencies, including the proportioning of inductance and capacitance elements of said network respectively with inductance and capacitance elements of said tuned inductive-capacitive reactance means, and the mechanical connection of rotors of said capacitance elements.

7. The combination with a thermionic alternating current generator, of a device for minimizing the frequency modifying action of variations of resistance of the resonant circuit of said generator, and of the cathode-anode and cathode-grid resistance of the thermionic tube, said thermionic generator having a thermionic tube with cathode, grid, and anode, and a three-terminal resonant circuit containing resistance, having a first terminal connected to the cathode, a second terminal connected to the anode, a third terminal connected to the grid through a stopping condenser, and said grid connected to the cathode through a leak resistance, said device consisting of an inductance and capacitance in series, tuned to the natural frequency of said resonant circuit, connected between said first terminal and cathode to carry the total cathode alternating current, and of coupling means variably coupled with said inductance, connected between said third terminal and said stopping condenser, whereby a secondary feed-back voltage is established upon said grid, in quadrature phase with the cathode-anode and cathode-grid alternating currents, and modified in proportion to said currents, and whereby equilibrium of said generator is maintained at the natural frequency of said resonant circuit, independent of variations of said resistances.

8. The combination with a thermionic alternating current generator, of a device for minimizing the frequency modifying action of variations of resistance of the resonant circuit of said generator, and of the cathode-anode resistance of the thermionic tube, said generator having a thermionic tube with cathode, grid and anode, a resonant circuit containing resistance connected to the cathode-anode, and a first coupling means coupling the grid-cathode with said resonant circuit, providing an ordinary feed-back voltage across the grid-cathode, said device consisting of an inductance and capacitance in series, tuned to the natural frequency of said resonant circuit, connected in series with the resonant circuit and cathode-anode resistance to carry the total cathode-anode alternating current, and of a second coupling means variably coupled with said inductance, connected in series with said first coupling means, whereby a secondary feed-back voltage is established, proportional to said total cathode-anode alternating current, in quadrature phase with said current, and proportioned to equalize the reactive voltage relative to said current of said resonant circuit, at said natural frequency, and whereby said ordinary feed-back voltage is maintained in phase opposition to said total cathode-anode alternating current independent of variations of said resistances.

9. The combination with a thermionic alternating current generator, of a device for minimizing the frequency modifying action of variations of resistance of the resonant circuit of said generator, and of resistance of the thermionic tube, said generator having a thermionic tube with cathode, anode and grid, a resonant circuit containing resistance, connected across the cathode and anode, and a first coupling means coupling said resonant circuit with the grid-cathode, said device having an inductance and capacitance in series, tuned to the natural frequency of said resonant circuit, connected in series between said resonant circuit and the cathode, to carry the total cathode alternating thermionic current, and a second coupling means variably coupled with said inductance, connected in series between the grid and said first coupling means.

10. The combination with a thermionic alternating current generator of a frequency-governor device, said thermionic generator having a thermionic tube with cathode, grid, and plate, and an inductance-capacitance network containing resistance, with input terminals connected in series with the cathode-plate circuit and output terminals connected to the grid-cathode, said network having the capability when excited at a specific frequency of providing a grid-cathode voltage in phase opposition to the input current, and having an input reactance at said frequency, said device consisting of a series inductance and capacitance tuned to said specific frequency, connected in the cathode-plate circuit in series with said input terminals, and of coupling means variably coupled with said inductance, connected in series with said output terminals across the grid-cathode, whereby a voltage is established across the grid-cathode proportional to the alternating current through said input terminals, in quadrature phase with said current, and proportioned to equalize upon amplification the reactive voltage of said input reactance, and whereby frequency equilibrium is maintained, by maintaining the voltage across said output terminals in phase opposition to the current through said input terminals, independent of variations of said network resistance, and of cathode-plate thermionic tube-resistance.

11. The combination with a thermionic alternating current generator of a frequency-governor device, said generator having a thermionic tube with cathode, grid, and plate, and a three-terminal network containing inductance, capacitance and resistance, having the capability when a voltage of specific frequency is impressed across a first and second terminal, of yielding a voltage across the first and third terminals in phase opposition to the alternating current supplied to said first and second terminals, said device having an independent inductance, and independent capacitance, connected in series between said first terminal and said cathode, tuned to said frequency, and variable coupling means coupled to said independent inductance, connected in series from said third terminal through a stopping condenser to said grid, and connections between the plate and said second terminal, and between the grid and cathode through a leak-resistance, whereby said frequency is generated, and the variations of said frequency minimized, independent of variations of said network resistance, and of the thermionic tube-resistance, between cathode and plate, and between cathode and grid.

12. The combination with a thermionic alternating current generator of a frequency-governor device, said generator having a thermionic tube with cathode, grid, and plate, means for supplying unidirectional current to the plate, and a phase-shifting network having the property when a voltage of specific frequency is impressed across a first and second terminal thereof, of yielding a voltage across the first and third terminals thereof, in phase opposition to the alternating current supplied to said first and second terminals, and having a reactive component of said impressed voltage relative to said current, said device having an inductance and a capacitance connected in series between the cathode and said first terminal, tuned to said frequency, and variable coupling means coupled to said inductance, connected from said third terminal through a stopping condenser to the grid, said grid being connected to the cathode through a leak resistance; and a connection between said plate and second terminal, whereby said frequency is generated, and maintained constant by equalizing said reactive component, and the quadrature component of grid-cathode voltage independent of variations of resistance within the thermionic tube, between cathode and plate, and between grid and cathode.

EDWARD H. LANGE.